United States Patent [19]

Nagano

[11] Patent Number: 4,637,273
[45] Date of Patent: Jan. 20, 1987

[54] BICYCLE BRAKE OPERATING DEVICE POSITIONED ON A DROP HANDLE

[75] Inventor: Masashi Nagano, Izumi, Japan

[73] Assignee: Shimano Industrial Company Limited, Osaka, Japan

[21] Appl. No.: 705,528

[22] Filed: Feb. 26, 1985

[30] Foreign Application Priority Data

Mar. 3, 1984 [JP] Japan ............................ 59-30863[U]

[51] Int. Cl.⁴ ............................................. G05G 11/00
[52] U.S. Cl. .................................. 74/489; 74/501 R; 74/551.8; 74/558.5
[58] Field of Search .............. 74/489, 501, 558.5, 74/551.8; 74/501 A, 501 B

[56] References Cited

U.S. PATENT DOCUMENTS 4,100,820  7/1978  Evett ...................... 74/489

FOREIGN PATENT DOCUMENTS 0051973  5/1982  European Pat. Off. .............. 74/489
1096784  1/1961  Fed. Rep. of Germany ........ 74/489
1183515  7/1959  France .
57-42149  9/1982  Japan .
406878   8/1966  Switzerland .

Primary Examiner—Albert J. Makay
Assistant Examiner—David W. Westphal
Attorney, Agent, or Firm—Stevens, Davis, Miller & Mosher

[57] ABSTRACT

A brake operating device for a bicycle in which an operating lever is pivotally supported to a bracket shaped generally like a right prism and having at its rear portion an opening which opens rearwardly. The outer surface of the bracket includes a bracket cover which covers the bracket. A restraint member is provided which restrains the bracket cover from moving with respect to the bracket. The restraint member is coupled with either the bracket or the operating lever and is retained to the edge portion of the bracket cover covering the opening at the bracket.

6 Claims, 7 Drawing Figures

BICYCLE BRAKE OPERATING DEVICE POSITIONED ON A DROP HANDLE

FIELD OF THE INVENTION

This invention relates to a brake operating device for a bicycle, and more particularly, to a brake operating device for a bicycle, which is used mainly for a drop handle. Such devices are provided with a bracket secured to each bent rod section of the drop handle, an operating lever supported to the bracket, and a bracket cover for covering the outer surface of the bracket, so that a cyclist operates the operating lever to actuate the brake while using his hand to grip the bracket through the bracket cover.

BACKGROUND OF THE INVENTION

Generally, a brake operating device is secured at its bracket onto one bent rod section of the drop handle so that the cyclist, when driving the bicycle at middle speed, steers the bicycle while gripping the bracket.

In this case, the cyclist leans his bust forwardly and the bracket is subjected to the weight of his bust.

The bracket is covered with a bracket cover formed of a soft material to soften his touch when gripping the bracket.

The bracket cover, which merely covers the bracket but is not coupled therewith, is subjected to a gripping force and the weight of the cyclist while gripping the bracket to steer the bicycle, thereby being elastically deformed. Also, the bracket cover, when subjected to an unbalanced load, may shift circumferentially or rearwardly with respect to the bracket, resulting in the cyclist's hand gripping the bracket being unstable and he feels uncomfortable during the bicycle's running.

For a brake operating device provided with a bracket cover covering the outer surface of the bracket, Japanese Utility Model Publication No. SHO 57-42,149 has disclosed a bracket cover provided at its front portion with a projection extending inwardly from the inner surface of the bracket cover and a bracket provided at the front portion with a bore engageable with the projection, thereby securing the bracket cover to the bracket through the engagement of the projection with the bore.

In a bracket cover so constructed, however, the edge of the opening thereof corresponding to the rear side opening of the bracket is not retained thereto, whereby the bracket cover cannot be prevented from undergoing elastic deformation caused by the gripping force of the cyclist applied to the bracket. Hence, the edge of the bracket cover at the opening side tends to expand in a rising fashion, resulting in the cyclist's hand gripping the bracket still being in an unstable condition. Also, during assembly, the aforesaid engaging projection at the bracket cover hinders the bracket cover from being easily fitted onto the bracket. On the other hand, the projection, when reduced in height to facilitate insertion, is liable to disengage from the bore at the bracket because of less engagement therebetween, thereby not ensuring fixing of the bracket cover to the bracket.

SUMMARY OF THE INVENTION

An object of the invention is to provide a brake operating device which has a bracket cover covering the bracket to allow a cyclist to feel comfortable when gripping the bracket to steer the bicycle and which eliminates the defect in prior art devices wherein the bracket cover expands at the edge covering the opening at the bracket and shifts as a whole with respect thereto.

This invention is characterized in that a brake operating device for a bicycle is provided with a bracket having a pair of side walls, front and rear walls in continuation thereof, and a rearward opening at the rear wall; an operating lever comprising a pivot portion interposed between the side walls and pivoted to the bracket and an operating portion extending rearwardly with respect to the opening at the bracket; and a bracket cover made from an elastic material and covering the outer surface of the bracket; and a restraint member which is (i) connected to the bracket or the lever, (ii) positioned at the opening side of the bracket, and (iii) engages with the edge of the bracket cover covering the opening portion of the bracket, thereby restraining the bracket cover from moving.

The restraint member extends along the edge of the opening at the bracket and can restrain the bracket cover from expansion at the edge of the opening thereof caused by elastic deformation occurring when the cover is subjected to the weight and gripping force of the cyclist while gripping the bracket to steer the bicycle. Also, the restraint member can restrain the bracket cover from moving at the edge side and prevent the cover from shifting as a whole with respect to the bracket. Hence, the cyclist, while gripping the bracket, can steer the bicycle with more stability and comfort.

In addition, the restraint member is integral mainly with the bracket, however, it may alternatively be integral with the lever. Also it may alternatively be separate from the bracket as well as the operating lever so as to be mounted thereto by a mounting means, or it may be mounted to a lever shaft pivotally supporting the lever.

These and other objects of the invention will become more apparent in the detailed description and examples which follow.

DETAILED DESCRIPTION OF THE INVENTION

Figure 1:
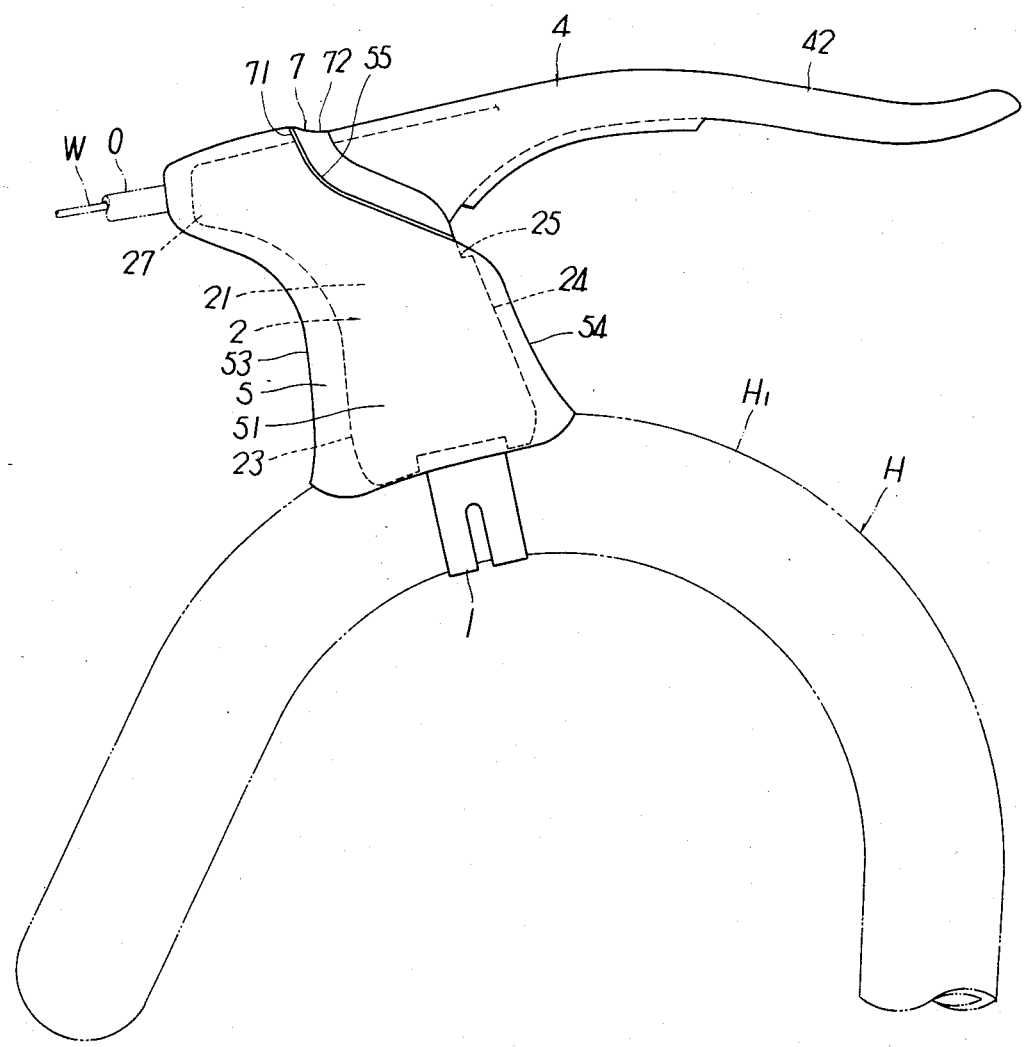
FIG. 1 is a side view of an embodiment of a brake operating device of the invention.
Figure 2:
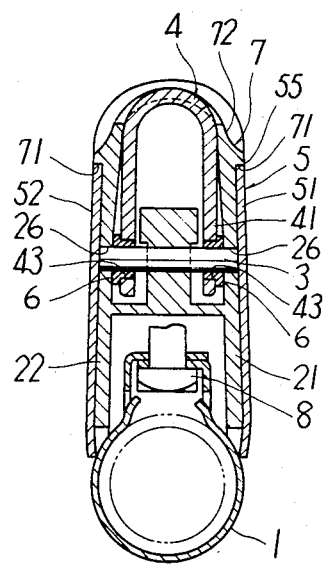
FIG. 2 is a longitudinal sectional rear view of the FIG. 1 embodiment.
Figure 3:
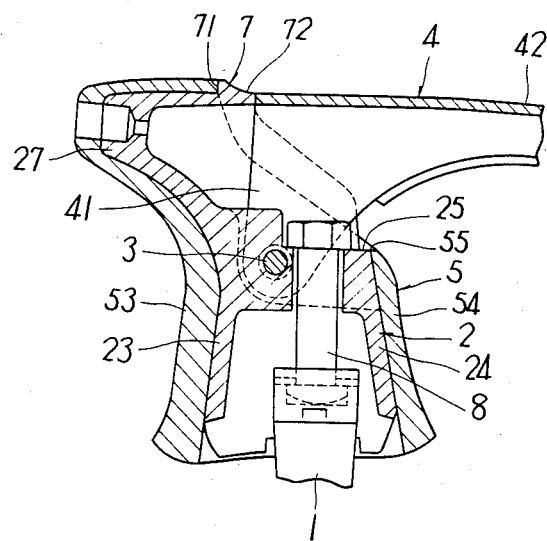
FIG. 3 is a longitudinal sectional side view of the same.

Referring to FIGS. 1 through 3, a brake operating device for a bicycle is illustrated, which is mounted onto one bent rod section $H_1$ at a drop hand H of the bicycle. The device comprises a bracket 2 having a lever shaft 3 and fixed to the bent rod section $H_1$ through a band member 1, an operating lever 4 pivoted to the bracket 2, and a bracket cover 5 fitted onto the outer surface of bracket 2.

The bracket 2 is right-prism-like-shaped and comprises a pair of opposite side walls 21 and 22, a front wall 23 swelling frontward, and a rear wall 24. Front and rear walls 23 and 24 are in continuation of the side walls 21 and 22 respectively. A rearward opening 25 is provided at the rear wall 24 and between the side walls 21 and 22, and a pair of through bores 26 are provided at the centers of side walls 21 and 22 respectively. Lever shaft 3 is supported to both the through bores 26, and a cylindrical support 27 is provided upwardly outwardly of front wall 23 and supports an outer sheath O guiding a control wire W.

The operating lever 4 comprises a pivot portion 41 of inverted-U-like shape in section. Pivot pattern 41 is inserted into the bracket 2 through the opening 25 thereof and is pivotally supported to the lever shaft 3. A rod-like-shaped operating portion 42 is bent perpendicularly from one end of pivot portion 41 and extends outwardly therefrom. The pivot portion 41 provides shaft bores 43 into which a pair of flanged bushings 6 are fitted so that the pivot portion 41 is supported swingably to the lever shaft 3 through the bushings 6. Also, at the connecting portion of pivot portion 41 and operating portion 42, a holder (not shown) for a retainer at a terminal of control wire W is provided.

The bracket cover 5 of right-prism-like shape comprises a pair of opposite side walls 51 and 52, a front wall 53 outwardly swelling, and a rear wall 54. Front and rear walls 53 and 54 are in continuation of the side walls 51 and 52 respectively. Between the side walls 51 and 52 and at the upper portion of rear wall 54 is provided an opening 55 corresponding to the opening 25 at the bracket 2, thereby preventing the operating lever 4 from interfering with the bracket cover 5.

The brake operating device constructed as abovementioned is provided at the bracket 2 or operating lever 4 with a restraint member 7 having an engaging portion 71 engageable wth the end face of opening 55 at the bracket cover 5.

The restaint member 7 shown in FIGS. 1 through 4 is integral with the edge of opening 25 at the bracket 2.

Figure 4:
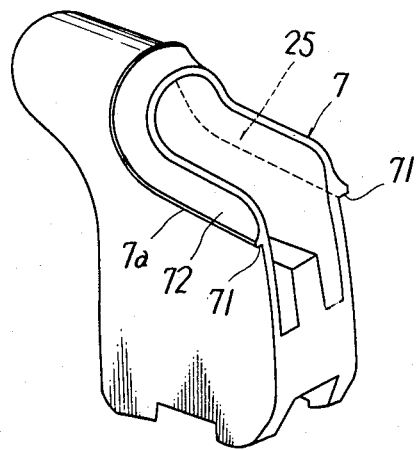
FIG. 4 is a perspective view of a bracket integral with a restraint member.

Also, the restraint member 7, as shown in FIG. 4, has an inverted-U-like-shape viewed from the rear and forms an engaging portion 71 extending from the outside edge of opening 25 to both side edges thereof and projecting toward the bracket cover side from the surface of restraint member 7 opposite to the end face of bracket cover 5.

The restraint member 7 shown in FIG. 4 is provided integrally with a continuous portion 72 having a surface inclining from the outer edge 7a of engaging portion 71 toward the outer surface of operating lever 4, so that a level difference between the opening 55 at the bracket cover 5 and the outer surface of lever 4 is reduced as much as possible by use of the continuous portion 72. Hence, the cyclist has less feeling of a foreign object even when the level difference interferes with his hand gripping the bracket 2 to operate the lever 4. Also, the reduced level difference gives the bracket 2 a good appearance.

In addition, a tightening bolt 8 is used to mount bracket 2 to the drop handle H through the band member 1.

The brake operating device is assembled in such a manner that the operating lever 4 is pivoted to the bracket 2, the opening 55 at the bracket cover 5 is fitted onto the bracket 2 from the outside of its mounting portion to the drop handle H, and then the bracket cover 5 is pushed to be fitted onto the bracket 2, at which time the end face of opening 55 at the bracket cover 5 engages with the engaging portion 71 at the restraint member 7 to restrain the bracket cover 5 from moving.

When the cyclist steers the bicycle while using his hand to grip bracket 2 in the posture of leaning his bust forwardly to apply its weight to the bracket 2, the opening 55 portion of bracket cover 5 is subjected to the cyclist's gripping force and tends to expand in elastic deformation. However, the engagement of the end face of opening 55 with the engaging portion 71 at the restraint member 7 restrains the elastic deformation, thereby bringing the portion of bracket cover 5 at the opening 55 side into close contact with the outside of bracket 2. Thus, the bracket cover 5 is free from rising or shifting upwardly or circumferentially of the bracket 2.

Also, when the cyclist squeezes the bracket 2 and the bracket cover 5 is intended to move outwardly of the opening 55, the engagement of the engaging portion 71 with the end face of opening 55 can exactly restrain the movement of bracket cover 5.

Figure 5:
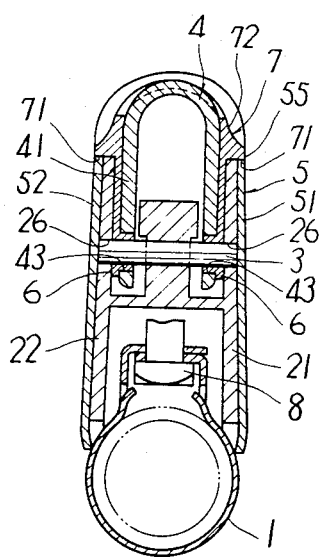
FIG. 5 is a longitudinal sectional rear view of a modified embodiment of the invention.
Figure 6:
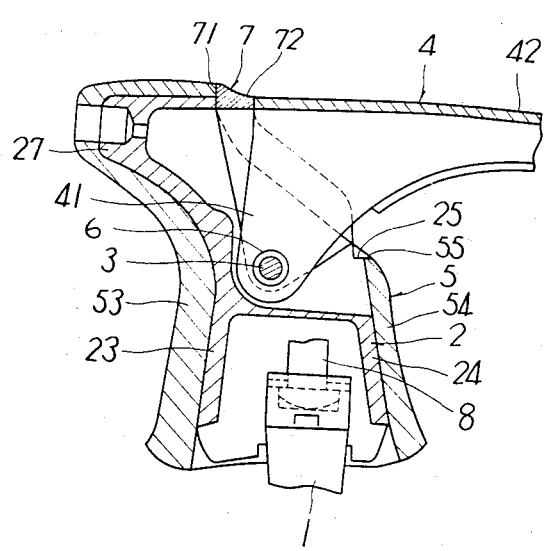
FIG. 6 is a longitudinal sectional side view of the FIG. 5 embodiment.
Figure 7:
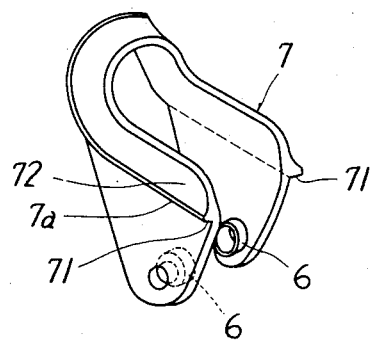
FIG. 7 is a perspective view of the restraint member only.

Alternatively, the restraint member 7 may be separate from the bracket 2. In this case, the restraint member 7 may, as shown in FIGS. 5 through 7, (i) be integral with the bushes 6 to be fitted into the shaft bores 43, (ii) mounted to the bracket 2 or operating lever 4 through a mounting means, such as a retaining mechanism, or (iii) integral with the operating lever 4.

As seen from the above, this invention provided with the restraint member can prevent elastic deformation at the opening portion of the bracket cover and shifting thereof with respect to the bracket, thereby securing the bracket cover with respect to the bracket to keep the stability of the cyclist's hand and facilitate the steering and braking action for the bicycle.

Also, no projection at the bracket cover facilitates mounting thereof to the bracket.

Although several embodiments have been described, they are merely exemplary of the invention and not to be construed as limiting, the invention being defined solely by the appended claims.

What is claimed is:

1. A brake operating device for a bicycle, said brake operating device being secured to a drop handle of said bicycle, said brake operating device comprising:

a bracket secured to a bent rod section of said drop handle, said bracket having a pair of side walls and front and rear walls in continuation of said side walls respectively and having a rear portion with an opening which opens rearwardly of said bracket;

an operating lever having a pivot portion interposed between said side walls, said pivot portion extending through said opening and being pivoted to said bracket, said operating lever further having an operating portion extending from said pivot portion rearwardly with respect to said opening in said bracket;

a bracket cover formed of an elastic material and covering an outer surface of said bracket; and a restraint member coupled with one of said bracket and said operating lever, said restraint member being positioned at an opening side of said opening in said bracket and comprising an engaging portion engaging with an edge portion of said bracket cover covering said outer surface of said bracket, whereby when a cyclist steers said bicycle while gripping said brake operating device such that said cyclist's weight is transmitted to said bracket, said restraint member is in position to restrain said bracket cover from moving relative to said bracket in response to application of said cyclist's weight.

2. A brake operating device for a bicycle as set forth in claim 1, wherein said restraint member is integral with an edge of said opening in said bracket.

3. A brake operating device for a bicycle as set forth in claim 1, wherein said restraint member is formed separately from said bracket and said operating lever and is mounted to one of said bracket and said operating lever through a mounting means.

4. A brake operating device for a bicycle as set forth in claim 3, further comprising a lever shaft mounted on said bracket for supporting said operating lever and wherein said restraint member is supported to said lever shaft.

5. A brake operating device for a bicycle as set forth in claim 4, wherein said operating lever includes shaft bores receiving said lever shaft and said restraint member comprises bushing means interposed between said lever shaft and said shaft bores.

6. A brake operating device for a bicycle as set forth in claim 1, wherein said restraint member comprises a continuous portion having an inclined surface which extends from said engaging portion engaging with said edge portion of said bracket cover toward said operating lever such that an outer surface of said bracket cover is substantially continuous with an outer surface of said operating lever.

* * * * *